Figure 1:
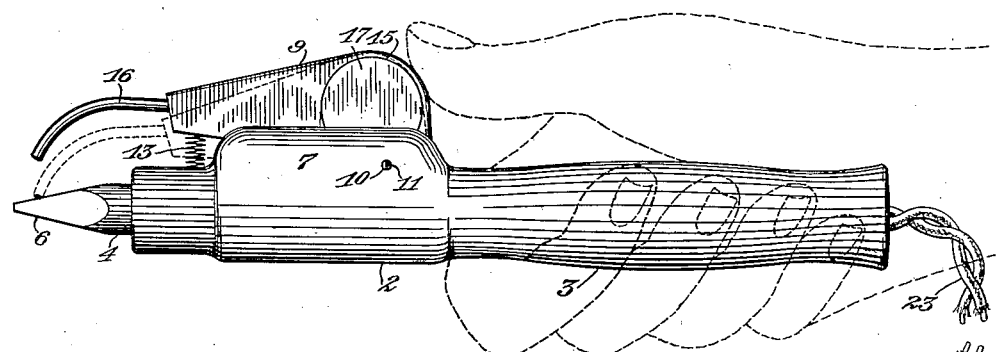

C. RYDEN.
SOLDERING TOOL.
APPLICATION FILED MAY 15, 1918.

1,287,448.

Patented Dec. 10, 1918.

Inventor:
Claes Ryden
By
Foster Freeman Watson &c
Attorneys.

UNITED STATES PATENT OFFICE.

CLAES RYDEN, OF CRANSTON, RHODE ISLAND, ASSIGNOR TO UNIVERSAL WINDING COMPANY, OF BOSTON, MASSACHUSETTS, A CORPORATION OF MASSACHUSETTS.

SOLDERING-TOOL.

1,287,448.  Specification of Letters Patent.  Patented Dec. 10, 1918.

Application filed May 15, 1918. Serial No. 234,668.

*To all whom it may concern:*

Be it known that I, CLAES RYDEN, a citizen of the United States, residing at Cranston, in the county of Providence, State of Rhode Island, have invented certain new and useful Improvements in Soldering-Tools, of which the following is a specification.

My invention is an improved, electrically-operated soldering-tool for use in the mechanical arts. The object of my improvement is to provide a device of this type having an electrically-heated point with means for holding a stick or strip of solder to adapt it to be carried into contact with the point to cause it to be melted to flow to the joint being soldered. A particular object of the improvement is to provide a soldering-tool which may be operated with one hand to furnish a continuous supply of solder and to fuse it and apply it to the work as occasion requires. A further object of the improvement is to economize in the expenditure of electrical-current for heating the tool by arranging the electrical circuit to be completed by the contact of the solder with the heating-point so that the current is automatically cut off when the tool is not in active operation.

The manner and means for carrying out these improvements are fully described in the following specification, illustrated by the accompanying drawings, in which like reference characters designate like parts. In the drawings:—

Figure 2:
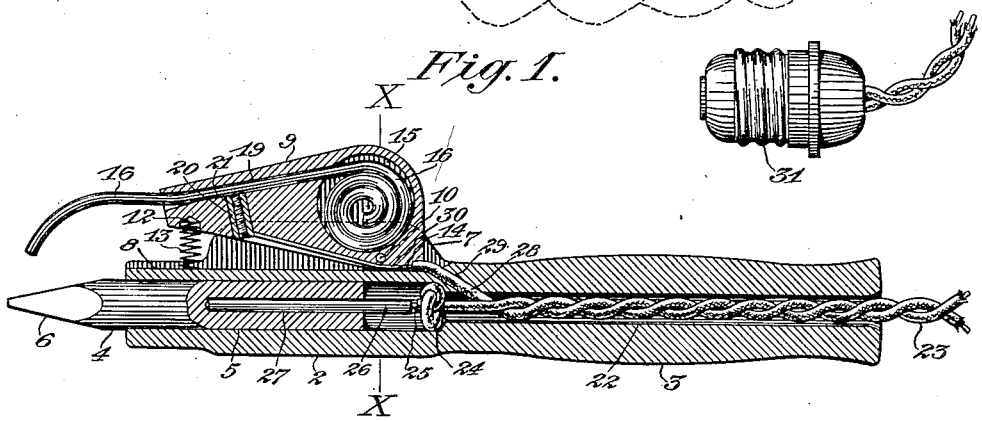
Figure 3:
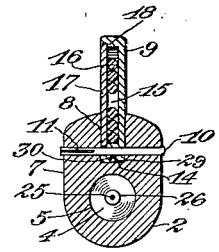

Figure 1 is a side elevation of my improved soldering tool, the dotted lines illustrating the manner of holding it in the hand and also indicating the method of operating it to carry the solder into contact with the heating-point;

Fig. 2, a vertical, sectional view of the tool taken on its longitudinal axis and showing the means for holding the solder and also the electrical connections; and Fig. 3, a transverse, sectional view of the tool taken on the line X—X of Fig. 2.

Referring to the drawings, my improved device comprises essentially a tubular holding-member 2 formed with a handle 3 at one end and adapted to mount a soldering point or bit 4 at its opposite end. The handle or holder 2 may be constructed of wood, fiber, vulcanized ribber, bakelite or any other suitable non-conducting material or dielectric, and is provided at its forward end with an axial bore 5. The soldering point or bit 4 is preferably constructed as a cylindrical stick of carbon adapted to fit snugly into the bore 5 of the holder 2 and sharpened at its outer end to provide the usual wedge-shaped nose 6.

Forward of its handle portion 3 the holder 2 is swelled out on its sides and extended upwardly in a crowned enlargement or lug 7. Cut through the top of the lug 7 is a central, longitudinal slot 8 to which is fitted a rockable finger-lever or trigger 9, see Figs. 2 and 3. The trigger 9 is preferably constructed of fiber or similar material, and is of substantially wedge-shape with flat sides and a circular rear edge. It is pivoted in the slot 8 by means of a pin 10 inserted through suitable holes in the sides of the enlargement or lug 7, one end of the pin being split at 11 to adapt its sides to spring apart to frictionally secure it in place. At the forward end of the trigger 9 is an undercut pocket 12 for receiving the end of a small coil-spring 13 which bears against the top of the holder 2 within the sides of the slot 8. The spring 13 acts to maintain the forward end of the trigger 9 normally raised away from the top of the holder 2 with its rearward, flattened edge 14 bearing against the bottom of the slot 8 to limit its rocking movement.

Cut into one side of the trigger 9 is a circular recess or pocket 15 adapted to serve as a magazine for holding a coiled strip of solder 16. The pocket 15 may be closed by any suitable cover such as the disk 17, shown in Figs. 1 and 3, which is fitted to abut a shoulder 18 formed on the rim of the opening and held in place by the side of the slot 8 in the lug 7. Leading from the pocket 15 to the forward end of the trigger 9 is a bore or passageway 19, see Fig. 2, through which the strip of solder 16 is inserted to bring its outer end into proximity with the bit or point 4 of the tool. A tubular bushing 20 is inserted in the underside of the trigger 9, substantially perpendicular to the bore 19, and is threaded on its interior to receive a set-screw 21. The screw 21 is adapted to be screwed through the bushing 20 to bind its end against the strip of solder 16 to hold the latter against unwarranted movement, and usually it is adjusted to allow the strip to be pulled through the passageway 19 to feed it from the coil in the magazine 15 as its end is melted away.

The strip of solder 16 and the heating point or bit 4 are employed as opposite terminals of the electrical circuit which supplies heat to the tool. The means for connecting them with the source of current are shown most clearly in Fig. 2 and are arranged as follows: The handle 3 of the holder 2 is formed with an axial bore 22 leading into the main bore 5. A double wire-cable or insulated conductor-cord 23 is led through the bore 22 and one of its ends knotted at 24 in the bore 5 to hold it in place. The wire 25 from this section of the cord 23 is soldered or otherwise united to a metal rod 26 which is inserted in an axial bore 27 in the carbon point or bit 4 to connect it electrically therewith. The wire 28 which forms the other conductor of the cord 23 leads up through an opening 29 in the holder 2, thence through a narrow slot 30 on the under side of the trigger 9 and is soldered or otherwise united to the bushing 20 which serves as a binding-post to electrically connect it with the strip of solder 16. If preferred, the wire 28 could be united to the solder-strip 16 by binding it thereagainst with the set-screw 21, but the arrangement first described is preferable as providing a permanent anchorage for the conductor. At the rear end of the holder 2 a suitable length of conductor cord is provided for connecting the tool with a lamp-socket or other contact-means and the usual screw-plug 31, shown in Fig. 1, may be attached to the end of the cord for this purpose. Having now described the construction and arrangement of my improved device, its method of operation will next be explained:

To prepare the tool for use the hand-lever or trigger 9 is first disconnected from the holder 2 by withdrawing the pin 10 from the lug 7. The cap or cover 17 is then removed from the side of the pocket 15 and a flexible bar or strip of solder 16 pushed through the bore 19 in the trigger 9. One end of the solder-strip 16 is then coiled around within the pocket 15 and the cover 17 may then be applied to its place again. A sufficient length of the strip 16 is left projecting from the forward end of the trigger 9 to adapt it to be bent down with its extremity closely adjacent the heating-point or bit 4, and the screw 21 is then tightened against the strip to hold it in place while allowing it to be drawn outwardly from the magazine 15 as occasion requires. After supplying the trigger with the solder-strip 16 it is replaced in the slot 8 of the holder 2 with the spring 13 under its forward end and the pin 10 forced back into position to serve as a pivot on which it rocks.

The tool is now ready for use and its conductor-cord 23 is connected with the source of electrical current in any suitable manner, as by applying the screw-plug 31 to a lamp-socket or other contact-means. The operator grasps the handle 3 of the holder 2 in any convenient manner with the finger or thumb resting against the rounded, rearward edge of the trigger 9, as indicated by the dotted lines in Fig. 1. By pressing forward with the thumb the trigger 9 may be rocked on its pivot 10 to carry the end of the solder strip 16 down against the heating-point 4, as illustrated by the dotted lines in Fig. 1. Immediately the solder 16 makes contact with the point 4 the electrical circuit is completed and the current from the wires 25 and 28 will cause the carbon to be heated almost instantaneously owing to its high degree of electrical resistance. The heat of the point 4 fuses the solder and by applying the end of the point to the work the solder will flow along its tapered nose to the joint being operated upon. In this manner the solder may be melted and applied to the work either continuously or intermittently, and in large or small quantities as desired, while only one hand is required to operate the tool, leaving the other free to hold or manipulate the parts being soldered. As the solder is melted away at the end of the strip the latter may be drawn out from the pocket 15 to provide a practically continuous supply, and after the strip is exhausted the magazine is easily recharged in the manner as above described.

When the soldering operation is completed the trigger 9 is released from the pressure of the finger and its spring 13 will thereupon elevate its forward end to raise the solder-strip away from the point 4. Through this action the electrical circuit is broken and hence the current will be immediately cut off. In this way the device acts automatically to shut off the current when the tool is not in use and hence is more economical to operate as regards the amount of current consumed. The automatic shutting off of the current also guards against overheating the tool, wasting the solder, or setting fire to the bench or other support on which it may be set, and therefore provides an important factor of safety against damage or accident. It will thus be observed that my invention provides a most convenient soldering-tool adapted for intermittent or continuous operation, while furnishing its own supply of solder, and arranged for automatic control to prevent wasting the current and to guard against danger or accident from fire. The operation of the solder-holding device controls the supply of current without the necessity of a separate switch so that the mechanism is extremely simple and less liable to derangement or getting out of order.

Various modifications might be made in the construction and arrangement of the parts of my improved device without departing from the spirit or scope of the invention; therefore, without limiting myself to the exact embodiment shown and described, what I claim is:—

1. In a soldering-tool, the combination with a holder provided with a heating-point and means for carrying a supply of solder, of a normally-open electrical circuit in the holder, and means to close said circuit by bringing the solder into contact with the point to heat the latter to fuse the solder and apply it to the work.

2. In a soldering-tool, the combination with a holder having a heating-point, of a supply of solder carried by said holder, means connecting the solder and point with opposite terminals of an electrical circuit, and means to operate the tool to bring the solder into contact with the point to close the circuit to heat the point and fuse the solder to apply the latter to the work.

3. In a soldering-tool, the combination with a holder carrying a heating-point, of means mounted on said holder for supporting a strip of solder to adapt it to be carried into contact with the point, a normally open electrical circuit in the holder, and means operating to close said circuit when the solder is brought into contact with the point to heat the latter to fuse the solder and apply it to the work.

4. In a soldering-tool, the combination with a holder carrying a heating-point at its end, of means to support a stick or strip of solder with its end in proximity to the point, means for connecting the point and solder in open circuit with a source of electrical current, and means to operate the solder-supporting means to bring the solder and point into contact to heat the latter to fuse the solder to apply it to the work.

5. In a soldering-tool, the combination with a holder having a heating-point, of a solder-supporting member rockably mounted on said holder to adapt it to be operated to carry the solder into contact with the point, and means for connecting the solder and heating-point in open circuit with a source of electrical current whereby when they are brought into contact the point will be heated to fuse the solder to apply it to the work.

6. In a soldering-tool, the combination with a holder, of a heating-point mounted thereon, a lever pivoted on the holder for supporting a strip of solder to adapt its end to be carried into contact with the heating point, means to operate the lever to cause it to normally maintain the solder away from the point, and means connecting the solder and point with a source of electrical current whereby when they are brought into contact the solder will be fused to flow to the work being operated upon.

7. In a soldering-tool, the combination with a handled holder, of a heating-point mounted at its end, a member pivoted on the holder and arranged to support a strip of solder with its end projecting toward the point, a spring for maintaining the lever in retracted position with the solder withdrawn from contact with the point, and means for connecting the solder and point in open circuit with a source of electrical current whereby the circuit will be closed by the contact of the solder with the point.

8. In a soldering-tool, the combination with a holder formed with a socket at its end, of a carbon heating-point fitted to said socket, a finger-lever pivoted on the holder to support a strip of solder in proximity to the point, and means for connecting the solder and carbon in open circuit with a source of electrical current whereby the circuit may be closed to heat the point by carrying the solder into contact with the latter.

9. In a soldering-tool, the combination with a holder formed with a hollow handle and a socket at its end, of a carbon heating-point fitted to said socket and formed with an axial bore, a conductor-wire extending through the handle of the holder, a rod connected to the end of the wire to adapt it to be inserted in the bore of the carbon, a finger-lever pivoted on the holder and adapted to carry a stick of solder, and a second conductor-wire leading through the handle of the holder and connected with the solder.

10. In a soldering-tool, the combination with a holder, of a heating-point mounted at its end, a lever pivoted on the holder and formed with a magazine for holding a coiled strip of solder with its end projecting toward the heating-point, and conductor-wires having their terminals united with the solder and heating-point and leading from the holder to adapt them to be connected with a source of electrical current.

11. In a soldering-tool, the combination with a handled holder, of a heating-point carried by said holder, a finger-lever pivoted on the holder and formed with a pocket on its side with a passageway leading therefrom, a strip of solder coiled within the pocket of the lever and projecting through the passageway to adapt its end to be brought into contact with the heating-point, and a conductor-cable having one of its terminals electrically connected with the solder and the other connected with the heating-point.

12. In a soldering-tool, the combination with a holder of non-conducting material, of a carbon heating-point mounted at the end of the holder, a finger-lever pivoted on the holder and provided with means for holding a strip of solder with its end projecting toward the heating-point, a conductor-cord in the holder, and means for electrically connecting the terminals of the cord with the solder and carbon.

13. In a soldering-tool, the combination with a holder provided with a socket at its end and a slotted lug on its side, of a heating-point fitted to the socket in the holder, a finger-lever pivoted in the slotted lug of the holder and provided with a pocket on its side with a passageway leading therefrom, a strip of solder coiled within the pocket with its end projecting through the passageway, a cover held in the pocket by the side of the slot in the lug, and a conductor-cord extending through the holder with its terminals electrically connected with the solder and heating-point.

14. In a soldering-tool, the combination with a holder, of a heating-point mounted thereon, a finger-lever pivoted on the holder and provided with a pocket on its side with a passageway leading therefrom, a strip of solder coiled within the pocket with its end projecting through the passageway, a binding-screw in the lever adapted to be adjusted against the solder to secure it in its passageway, and a conductor-cord having one terminal electrically connected with the binding-screw and its other terminal connected with the heating-point.

In testimony whereof I affix my signature.

CLAES RYDEN.